Patented Dec. 30, 1941

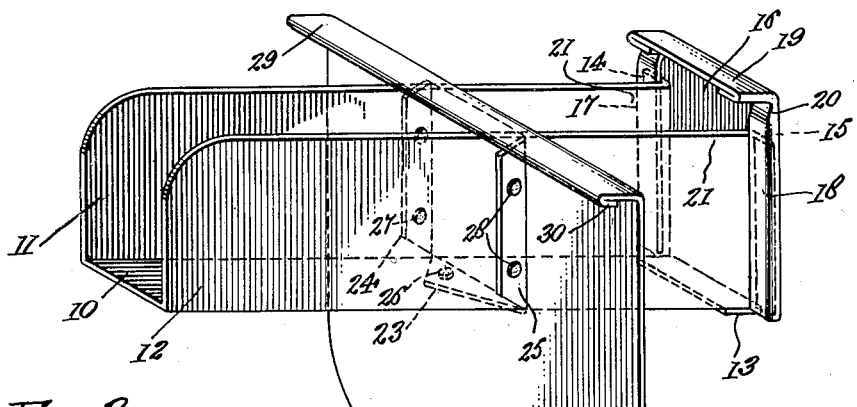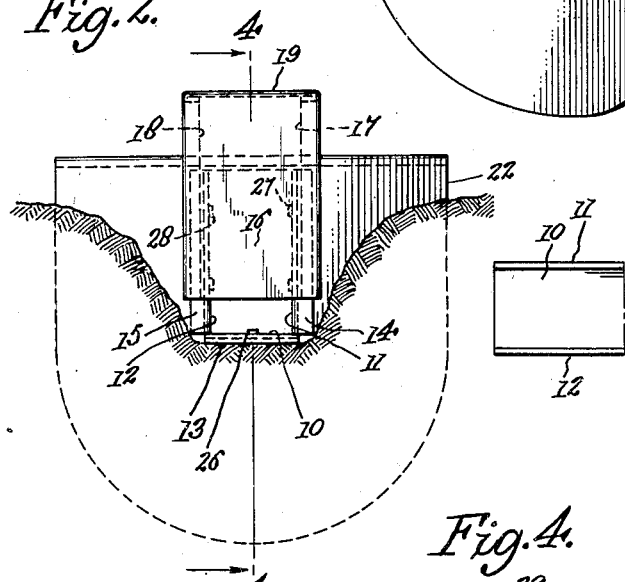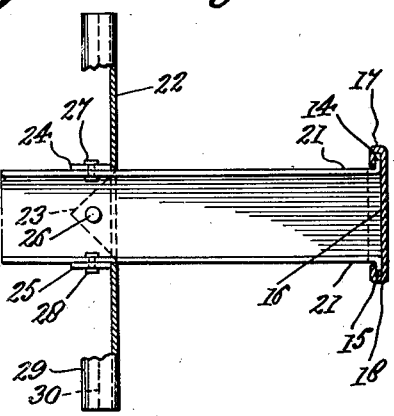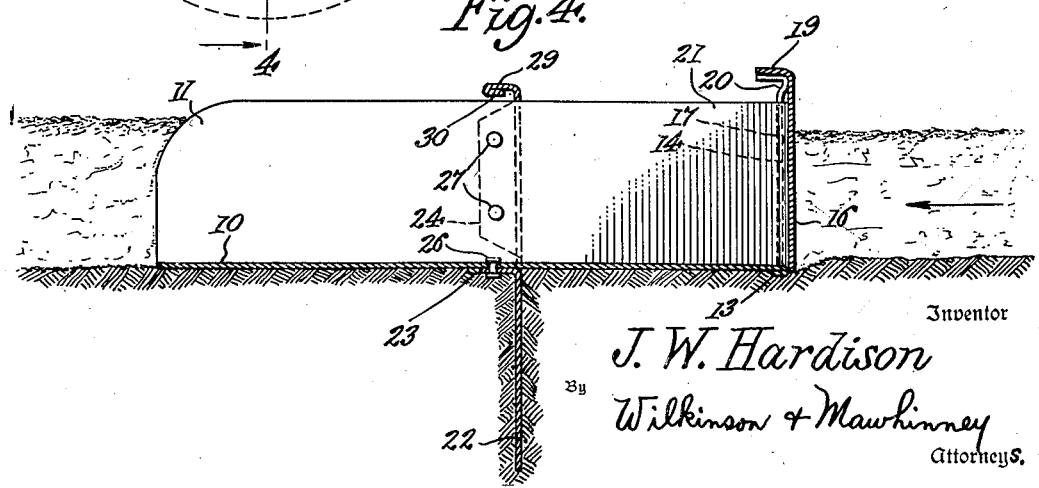

2,268,480

UNITED STATES PATENT OFFICE 2,268,480

PORTABLE IRRIGATION DAM

James W. Hardison, Yakima, Wash.

Application January 13, 1941, Serial No. 374,295

4 Claims. (Cl. 61—29)

The present invention relates to improvements in portable irrigation dams, and has for an object a simple form of such device that lends itself to quick and easy installation and ease in regulation.

To properly irrigate farm land, and most of the heavy producing districts of the West are irrigated to maintain the correct amount of moisture in the ground, it is necessary to have check dams to raise the water in the head ditches to the level of the land so that it will flow down small corrugation ditches which are spaced about three feet apart and are from four to six inches deep and regulate the amount of water in these corrugation ditches with a check in each ditch.

For a farmer to construct a suitable dam it is necessary to build either of concrete or of wood a head gate which acts to raise the water so that it can be brought from the bottom of the head ditches, which are usually from eighteen to thirty-six inches deep, to the surface for irrigation; and to allow the necessary amount of water to flow through the dam, which overflow is used at the next dam, where it is divided again, the overflow going down the ditch after the proper amount has been taken to irrigate the rows of ditches between the dams.

It is an object of the invention to eliminate the expensive procedure of having permanent dams, and to provide a form of metallic dam purchasable in quantities at low cost to the end that the farmer may possess great numbers of these dams which are self-contained units and may be numerously located on the farm in many ditches.

It is a further object of the invention to provide a unitary dam which admits of its removal from the ground when plowing to enable the rancher to plow his head ditches when he plows his fields to eliminate the growth of weeds along the ditch bank; a process that cannot be done when permanent dams extend into the bank of the ditch, unless the rancher goes to the expense of removing the permanent dams before plowing.

A still further object of the invention is to avoid past difficulties in the provision of a portable dam constructed for ease in carrying and in insertion and removal from the ground, and which, when in place, will effectively seal the ditch against flow of water past the dam except for the regulable amount purposely admitted by the spillway gate.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a perspective view of a portable irrigation dam constructed in accordance with the present invention with the spillway gate closed.

Figure 2 is an end elevation from the right end of Figure 1 and with the gate partially raised.

Figure 3 is a top plan view with parts broken away and parts shown in section, and Figure 4 is a longitudinal vertical section taken on the line 4—4 of Figure 2.

Referring more particularly to the drawing, the improved device is shown as constructed of three pieces of sheet metal comprising the flume, the gate and the stabilizing wing.

The flume comprises a bottom wall 10 and side walls 11 and 12 with a bottom reinforcing flange 13 and side guide flanges 14 and 15 formed at one end thereof. The side walls 11 and 12 are preferably bent up vertically from the same piece of resilient sheet metal with the bottom wall 10 forming a construction of suitable width and height to be placed in one of the head ditches in the manner indicated in Figures 2 and 4. The flume thus formed is open at its top and ends. The bottom flange 13 is preferably off the original end of the bottom wall 10, being split from the lower edges of the out-turned guide flanges 14 and 15 and folded under the bottom wall and in contact with the bottom wall in such position that its bight edge which is contacted by the gate and forms a threshold therefor as seen in Figure 4, lies in the vertical plane of the guide flanges 14 and 15 and stiffens and reinforces the same as well as the entire flume structure.

The body of the gate proper is designated at 16. Flanges 17 and 18 overturned from its side or vertical edges embrace and overlap the guide flanges 14 and 15 respectively and mutually guide the gate 16 in its up and down or vertical motion. To accomplish the last-named motion a handle 19 is provided by turning over the upper edge of the gate at substantially right angles or to an approximate horizontal position, the flanges 17 and 18 being flattened against the overturned parts, as from the crimps 20 upwards. These flattened flanges form reinforcements and protections for the side edges.

The fin or wing 22 has flanges 23, 24 and 25 secured respectively by rivets or other fastenings 26, 27 and 28 to the bottom 10 and sides 11 and 12 of the flume. The wing 22 is much wider than the flume to span a wider ditch, as represented in Figure 2. The upper edge of the wing is turned over to form a handle 29 and the free edge 30 of the handle is turned beneath the same to reinforce, strengthen and stiffen the handle and the wing 22 and incidentally the cross-section of the trough or flume.

The flume is formed from a single piece of sheet metal, the gate from a single piece of sheet metal, and the wing from a third separate piece of sheet metal.

The bottom corners of the wing 22 are removed and the entire lower edge rounded to facilitate its penetration into the ground. The wing 22 extends away below the bottom 10 of the flume and outwardly beyond the side walls 11 and 12. The wing is spaced from the gate 16, the wing being intermediate the ends of the flume, preferably about midway such ends.

In the use of the device the wing is forced down into the ditch bank in the manner represented in Figures 2 and 4 with the water flowing in the direction of the arrow in Figure 4 although it may flow in the other direction; in other words the gate may be either upstream or downstream as regards the wing 22. In this position the wing extends considerably beyond and below the ditch and forms a seal or dam which stems the passage of the water except such as may be allowed by gate 16 to pass through the restricted flume.

By pressing toward one another the side walls at 21, 21, the resilient pressure which biases the guide flanges 14 and 15 to an outward position frictionally pressing on the gate flanges 17 and 18 is relieved, thus allowing the gate 16 to be raised or lowered to increase or decrease the port area of the spillway and regulate and control the height of water in the ditches and the rate of irrigation.

The handle 19 allows the gate to be conveniently raised and lowered while the other hand squeezes the walls at 21, 21. The crimps so act as stops to limit the descent of the gate 16 and in this action the crimps are backed up by the handle 19.

The handle 29 enables the irrigator to carry the dam about the fields, to raise the dam from the ditch and also force it into a new ditch. The handle 29 is constructed to receive blows from an implement to promote easy penetration, which blows are resisted edgewise by walls 11 and 12.

If desired dirt of the ditch bank is filled around flume before and behind wing 22 to prevent device leaking more water than operator cares to apply. The amount of water is regulated through gateway 16.

The wing 22 being intermediate the flume and not at the end thereof affords sections of the bottom wall 10 in opposite directions from the wing 22. Such bottom sections encounter the earth at the bottom of the ditch and with the central wing 22 confine quadrants of earth which are mutually and simultaneously acted on by both sides of the wing 22 and both bottom sections. These four sections of substantial surface area coact to prevent rocking of the assembled device vertically and longitudinally of the flume. The device thus maintains its place irrespective of flow conditions in the ditch or the condition of the earth that is whether it is soft, hard, loose, etc.

The flume is set in the bottom of the ditch. Its purpose is to provide a suitable spillway to prevent the entire device from being undermined and to provide a suitable seat for the wing; and to assist to hold the wing vertically and against collapse.

The regulating door or gate is adjusted to allow the desired amount of water to enter the flume by the various positions at which the gate may be set. When the pressure is removed at 21 the guide flanges 14 and 15 will spread to binding engagement on the gate flanges and hold the gate at the set position so that the flow of water will not change the setting.

In such a portable irrigation gate and weir the fact that the vertical wing or fin is somewhat removed from the front of the device, preferably in the center of the flume, produces a better seal in that dirt and earth will be in front of and behind the wing to prevent the breaking of the seal. The wing also is hemmed or folded double at the top and then bent at right angles to the wing which serves to strengthen it so that it can be constructed of fairly light gauge sheet metal.

It will be appreciated from the foregoing that the invention provides a spillway conduit that prevents the device from being undermined, and provides a simple regulating gate easy to set and remaining in the set position.

It is obvious that various changes and modifications may be made in the details of construction and design of the above specifically described embodiment of this invention without departing from the spirit thereof, such changes and modifications being restricted only by the scope of the following claims.

What is claimed is:

1. A portable irrigation dam comprising a sheet metal flume having bottom and resilient side walls, guides on the side walls biased to a spread position and movable toward one another by compressing the side walls together, and a gate having parts embracing and slidable on said guides and normally bound frictionally in adjusted position thereby but releasable from said guides on the movement of the walls toward each other.

2. A portable irrigation dam comprising a sheet metal flume having bottom and resilient side walls, out-turned guide flanges on the side walls, and a metallic gate having flanges overlapping with the guide flanges and bound in position by the resiliency of the side walls tending to move the guide flanges outwardly of the flume, and releasable from the resilient pressure by the movement of the side walls together.

3. A portable irrigation dam comprising a sheet metal flume having bottom and resilient side walls, out-turned guide flanges on the side walls, and a metallic gate having flanges overlapping with the guide flanges and bound in position by the resiliency of the side walls tending to move the guide flanges outwardly of the flume, and releasable from the resilient pressure by the movement of the side walls together, said gate flanges being bent from the body of the gate with the metal returned upon itself, said gate flanges at the upper portion of the gate being crimped flat against the gate to close the gate flanges which below the crimps are in the form of channels.

4. A portable irrigation dam comprising a sheet metal flume having bottom and resilient side walls, out-turned guide flanges on the side walls, and a metallic gate having flanges overlapping with the guide flanges and bound in position by the resiliency of the side walls tending to move the guide flanges outwardly of the flume, and releasable from the resilient pressure by the movement of the side walls together, said gate flanges being bent from the body of the gate with the metal returned upon the material of the gate and said crimped flattened channel flanges being bent over at approximately right angles to the plane of the gate above said crimps to form a reinforced rigid handle for raising and lowering the gate.

JAMES W. HARDISON.